United States Patent
Jensen

(10) Patent No.: US 9,605,994 B2
(45) Date of Patent: Mar. 28, 2017

(54) PAYLOAD MONITORING COMPARISON

(71) Applicant: Caterpillar Inc., Peoria, IL (US)

(72) Inventor: Jeffrey E. Jensen, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 316 days.

(21) Appl. No.: 14/303,226

(22) Filed: Jun. 12, 2014

(65) Prior Publication Data

US 2015/0362358 A1 Dec. 17, 2015

(51) Int. Cl.
*G01G 19/14* (2006.01)
*G01G 19/08* (2006.01)
*G06Q 10/06* (2012.01)
*G06Q 40/00* (2012.01)
*G06Q 50/08* (2012.01)
*G01G 19/64* (2006.01)

(52) U.S. Cl.
CPC ............ *G01G 19/08* (2013.01); *G01G 19/64* (2013.01); *G06Q 10/06393* (2013.01); *G06Q 40/12* (2013.12); *G06Q 50/08* (2013.01)

(58) Field of Classification Search
CPC ...................................................... G01G 19/08
USPC ............................................ 414/21; 702/174
See application file for complete search history.

(56) References Cited

U.S. PATENT DOCUMENTS

| 7,594,441 B2 | 9/2009 | Gudat et al. | |
|---|---|---|---|
| 7,864,066 B2 | 1/2011 | Kriel et al. | |
| 2008/0169131 A1* | 7/2008 | Takeda | E02F 9/26 702/174 |
| 2008/0208415 A1* | 8/2008 | Vik | E21C 41/26 701/50 |
| 2009/0084173 A1* | 4/2009 | Gudat | B60P 1/283 73/146 |

FOREIGN PATENT DOCUMENTS

EP 2144191 A1 1/2010

* cited by examiner

*Primary Examiner* — Hunter Wilder
(74) *Attorney, Agent, or Firm* — Miller, Matthias & Hull

(57) ABSTRACT

Real time monitoring and comparison of bucket payload and truck payload during a loading process allows calculation of material lost in transfer between the loader and the truck. The lost or spilled material represents increased costs due to additional trips of the loader to fully load trucks and also in non-value added worksite cleanup time. The payload monitoring system can not only evaluate the mass of material lost over a period of time but can also calculate the value of that lost material using real time commodity pricing. The period of time can range from a single bucket dump to a workshift or longer. Payload masses and/or calculated values may be communicated directly between vehicles or may be communicated in conjunction with a central station.

10 Claims, 5 Drawing Sheets

US 9,605,994 B2

PAYLOAD MONITORING COMPARISON

TECHNICAL FIELD

The present disclosure relates generally to loaders and more particularly to a process for determining losses to due undesired events during the process of loading a truck using a loader.

BACKGROUND

In quarries and other types of payload material collection sites, mobile loaders, such as wheel loaders, backhoe loaders, and track type loaders are used to load loose payload material into haul vehicles, such as over the road trucks. In the course of loading the truck some material may not successfully transfer from the loader to the truck and drop to the ground. The material that misses the truck requires, over a day, more trips of the loader to fill the trucks as well as periodic cleanup work to clear the spilled material, both of which require non-productive work time.

European patent EP2144191 discloses a system that weights material when it is stored in a warehouse and weights it again when it is removed from storage and loaded on a truck for use in inventory tracking and in order to determine if a theft has occurred while the material was in the warehouse. The '191 patent fails to disclose lost material mass that occurs while loading a truck.

Co-owned U.S. Pat. No. 7,864,066 describes a system that monitors for material falling off a truck while traveling to its destination but fails to quantify the loss or discuss material that is lost during the loading process.

SUMMARY

In one aspect, a method of measuring material lost during vehicle loading includes receiving, at a controller, a bucket payload mass of a material delivered via the bucket of a loader to a truck and a truck payload mass of the material received via the bucket of the loader at the truck. The controller or a related computing device may calculate a lost material mass of the material as a difference between the bucket payload mass and the truck payload mass.

In another aspect, A system for use in measuring material lost during vehicle loading at a worksite may include a loader having a bucket and a bucket payload monitor that reports a first payload mass of a material delivered via the bucket of the loader. The system may also include a truck configured to carry the material and a truck payload monitor that reports a second payload mass of the material loaded onto the truck via the bucket of the loader. The system may further include a controller that subtracts the second payload mass from the first payload mass to generate a lost payload mass.

In yet another aspect, a controller for use in measuring a lost mass of a material developed during vehicle loading at a worksite may include a memory that stores program modules and data, a processor coupled to the memory that executes the program modules, an input that receives a bucket payload mass from a loader and a truck payload mass of the material delivered from the bucket to a truck, and a program module stored in the memory that, when executed by the processor, subtracts the truck payload mass from the bucket payload mass to produce the lost material mass.

These and other benefits will become apparent from the specification, the drawings and the claims.

DESCRIPTION

Figure 1:
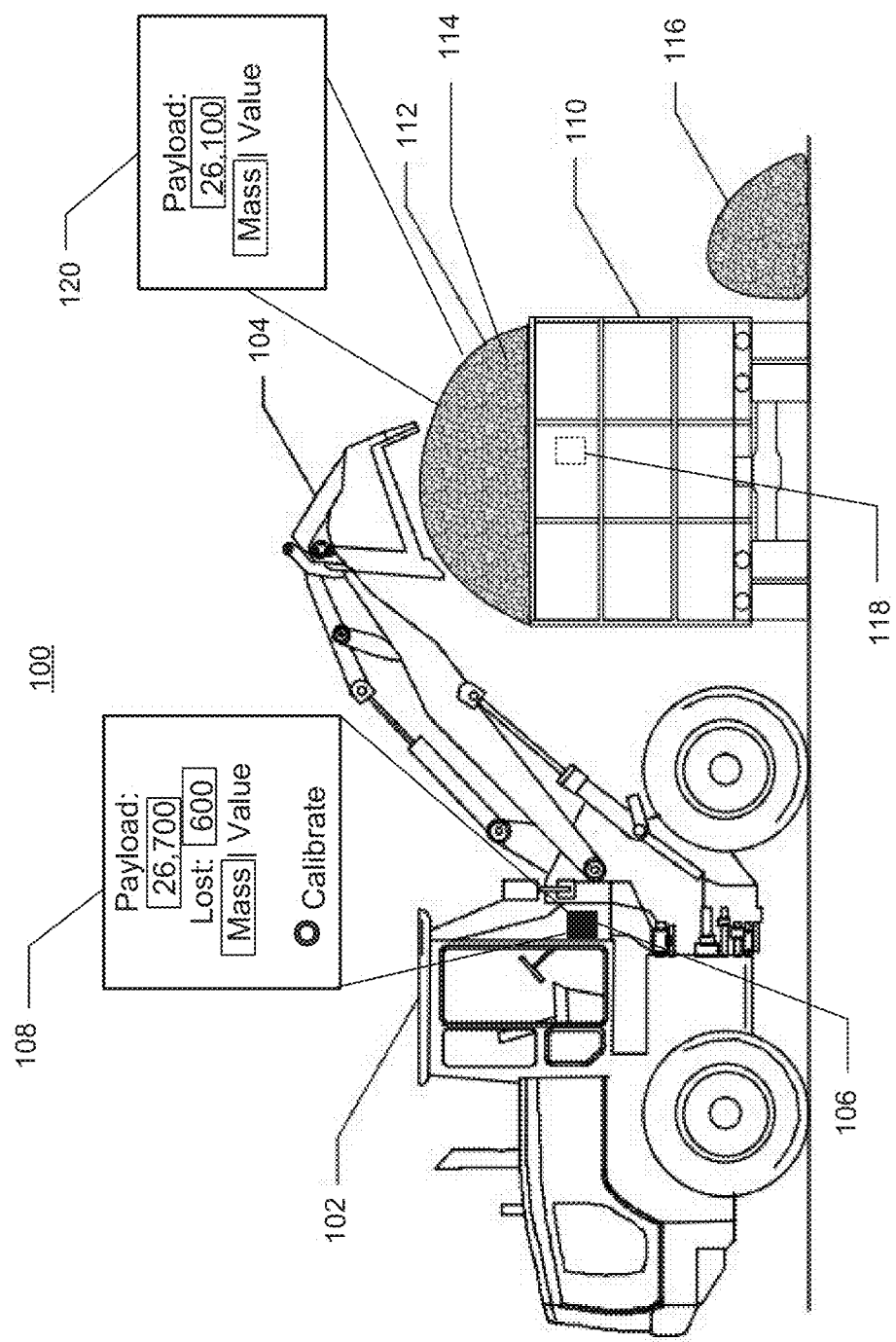
FIG. 1 is a view of a worksite with a loader and truck.

FIG. 1 illustrates worksite 100 illustrating a loader 102 having a bucket 104, and a controller 106 that presents information via an operator display 108. The controller 106 may use sensors (not depicted) to calculate a bucket payload of material 114 prior to the bucket 104 being emptied. The worksite 100 also illustrates a truck 110 loaded with a payload 112 of material 114. Also illustrated is a quantity of lost material 116 spilled during the process of emptying the bucket 104 into the truck 110. A controller 118 (hidden) may use sensors to calculate a mass of the payload 112 of material 114, which may be displayed via display 120. Both the operator display 108 and the truck display 120 may be parts of user interfaces supported by the respective controllers 106 and 118. These user interfaces may also present selections for what metric to display and, in the case of the loader 102, whether or not this is a calibration sample. The controllers 106 and 118 may be part of a respective payload control system, engine or body control system, or may be separate standalone units.

Figure 2:
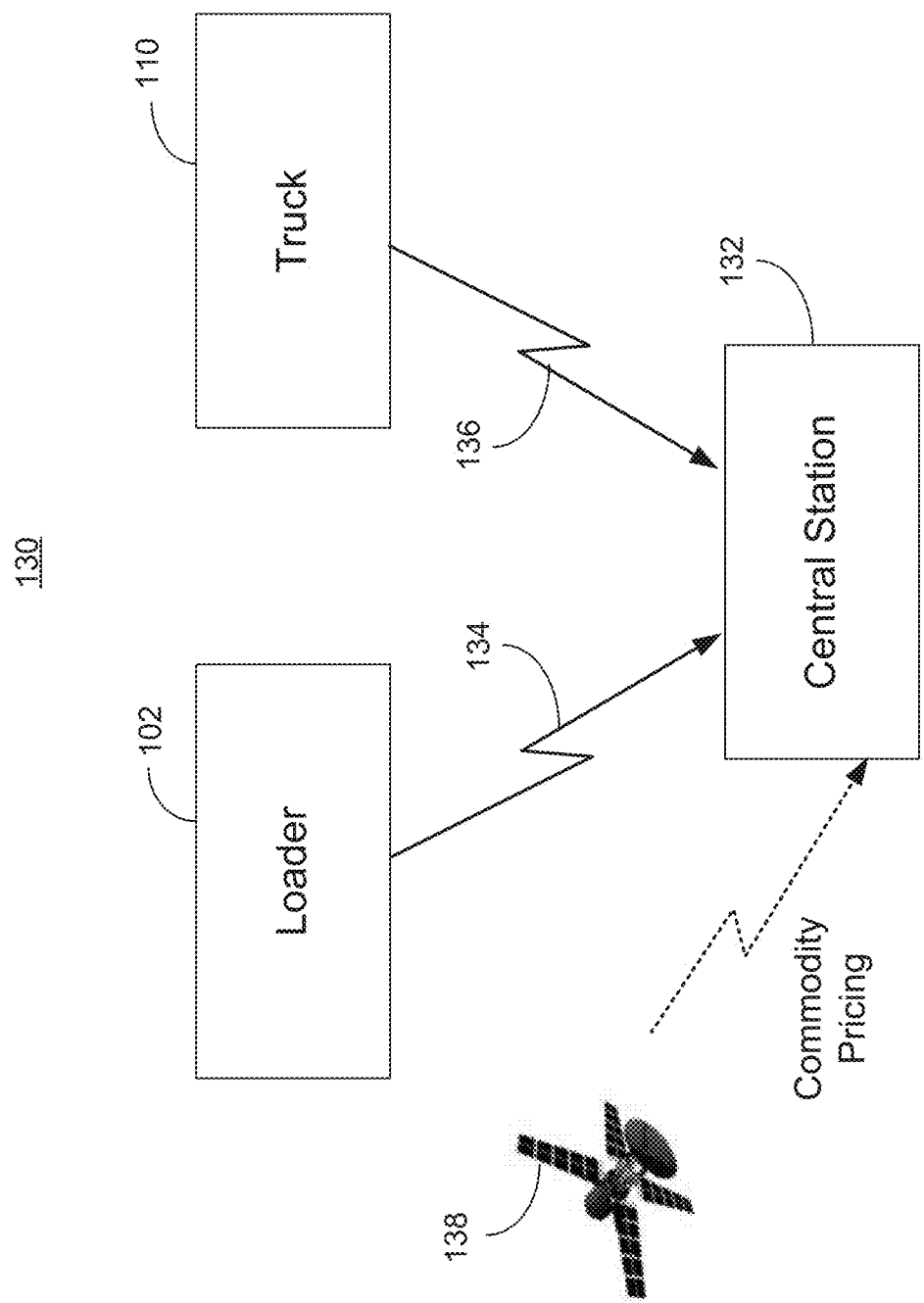
FIG. 2 is a block diagram of a system for payload monitoring comparison.

FIG. 2 is a block diagram of a system configuration 130 for implementing a payload monitoring comparison. In this embodiment, the loader 102 may report the bucket payload mass of material 114 delivered after a dump operation to a central station 132 over a network link 134. The network link 134 may be a real time wireless link but in other embodiments bucket payload amounts may be reported via a wired network or flash drive once the loader 102 has returned to a work center, for example, at the end of a shift.

Similarly, the truck 110 may report truck payload amounts corresponding to a particular delivery of material 114 via the bucket 104 using a wireless link 136 to the central station 132.

The central station 132 may use the bucket payload mass and the truck payload 112 mass to arithmetically arrive at a mass of the lost material, such as lost material 116 (e.g., spillage) of FIG. 1. The lost material may occur if the truck 110 is overfilled either in one area or entirely, so that excess material spills out of one or both sides of the truck 110. In other cases, the bucket 104 may be incorrectly positioned when emptying so that some of the material misses the truck 110 entirely and is dumped directly on the ground.

In an embodiment, the central station 132 may have a commodity price of the material, for example, that may be received via a satellite 138 or other network service. The commodity price may be used to calculate a value of the lost material. Additionally, the mass or even the volume of the lost material may be used to calculate an approximate cleanup time, using for example, a number of minutes per cubic yard for cleanup multiplied by the cost per minute to operate the loader 102 and/or other vehicles used in the cleanup.

Any or all of the values for lost material mass, lost material value, and cleanup costs may be sent from the central station 132 to the loader 102. In some cases, such as where a truck driver may have a direct involvement in material spills, for example, moving before loading is complete, the truck 110 may also display one or more of these values.

Figure 3:
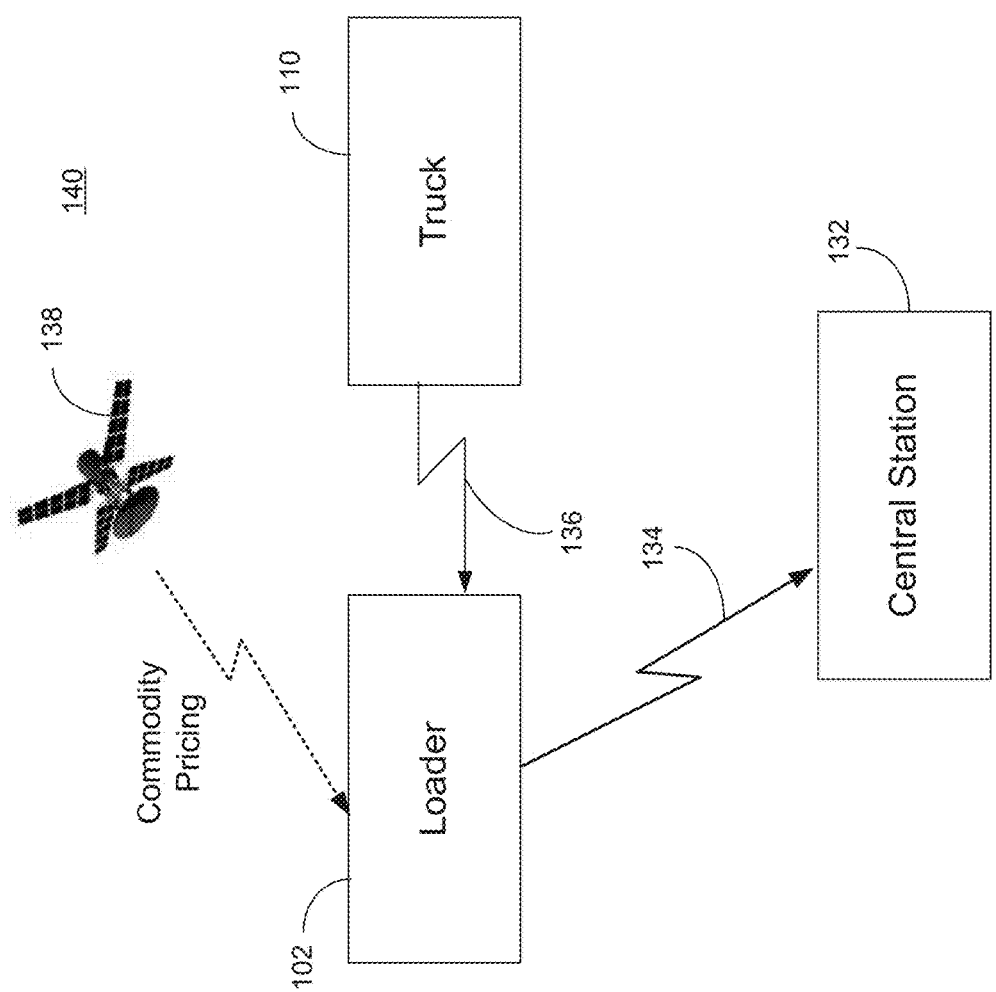
FIG. 3 is a block diagram of an alternate embodiment of a system for payload monitoring comparison.

FIG. 3 illustrates another system configuration 140 for implementing a payload monitoring comparison. In this embodiment, the truck 110 may report the truck payload 112 to the loader 102, where the comparison of bucket payload, measured locally at the loader 102, and the truck payload is made. In this exemplary embodiment, the loader 102 may report the results of the comparison to the central station 132. As illustrated, the loader 102 itself may store or receive the commodity pricing of the material. Other combinations are possible, including the loader 102 providing the lost material mass to the central station 132 and the central station 132 adding the value calculations as in the configuration of FIG. 2.

To illustrate further using a specific embodiment, the loader 102 may have a bucket 104 that carries 10 cubic yards of material. For dry gravel, a mass of 10 cubic yards may weigh about 26,700 pounds. If 26,100 pounds of payload gravel are received at the truck 110, simple subtraction says that 600 pounds of material was lost in the transfer, assuming good calibration between loader 102 and truck 110 and minimal errors measuring the respective masses. If gravel sells for $28 per ton, the value of 600 pounds is about $8.40.

Figure 4:
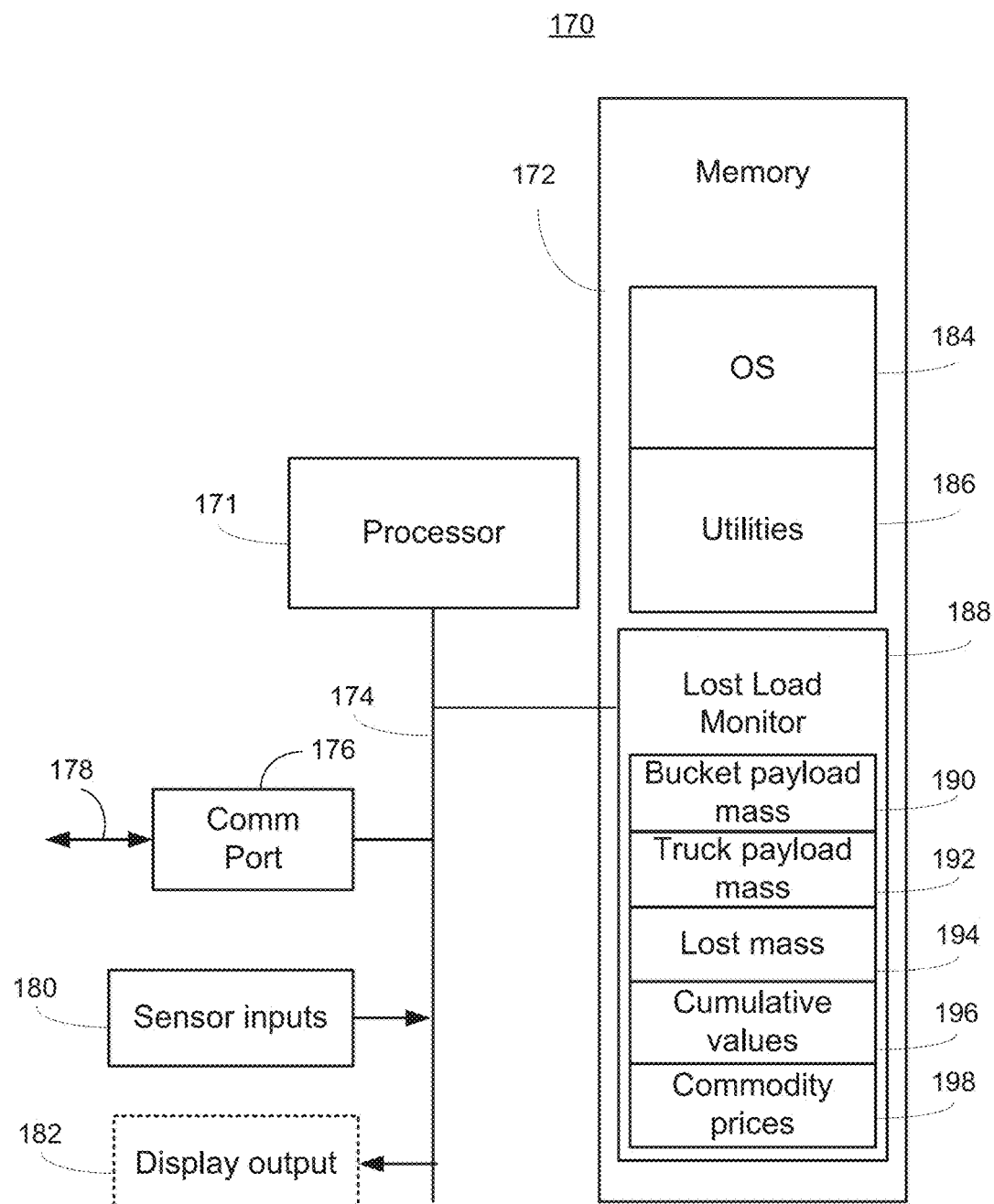
FIG. 4 is a block diagram of a controller for use in payload monitoring comparisons.

FIG. 4 is a block diagram of a representative controller 170. The controller 170 may be the same as or similar to the controller 106 or 118 of FIG. 1, or may be incorporated in the central station 132. The controller 170 may be part of or adjunct to another electronics computing module (not depicted) that may include an engine controller, chassis controller, etc. The controller 170 may include a processor 171 and a memory 172 that communicate via an internal communication bus 174. The controller 170 may include or may provide data to a display 108 via display output 182.

The controller 170 may send and receive data via a communication port 178. Sensor input block 180 may receive information from a variety of sensors, including one or more strain gauges, lift cylinder position sensors, and/or hydraulic pressure sensors (not depicted) for use in determining bucket payload mass or truck payload mass.

The memory 172 may be any combination of volatile and non-volatile memory, including rotating media, flash memory, conventional RAM, ROM or other non-volatile programmable memory, but does not include carrier waves or other propagated media. The memory 172 may include an operating system 184 and utilities 186, such as diagnostic routines, etc. The memory 172 may also include executable code and data, such as a lost load monitor module 188 and data storage for values, such as but not limited to, bucket payload mass 190, truck payload mass 192, lost mass 194, cumulative values 196, such as cumulative lost mass and cumulative value of lost mass, and commodity prices 198 used for calculating value.

The controller 170 is an illustration of one embodiment for implementing the payload monitoring comparison. In other embodiments, the functions supported by the controller 170 may be arranged differently, spread between processing units in separate vehicles or controls stations, or maintained in a cloud service remote from the worksite 100, to name a few variations.

INDUSTRIAL APPLICABILITY

The ability to track lost material during loading provides a valuable tool for improving productivity and for operator training and real time feedback. A worksite manager gets valuable information in the form of business metrics about the operation and can use these business metrics to improve conditions that may lead to more accurate loading, such as more consistent location of trucks 110 or position guidance for loaders 102.

These business metrics may include lost material per shift, worksite cleanup time costs, additional loader work cycles (extra trips) due to lost material, the operating expense of both the cleanup operation and the additional loader work cycles, etc.

Figure 5:
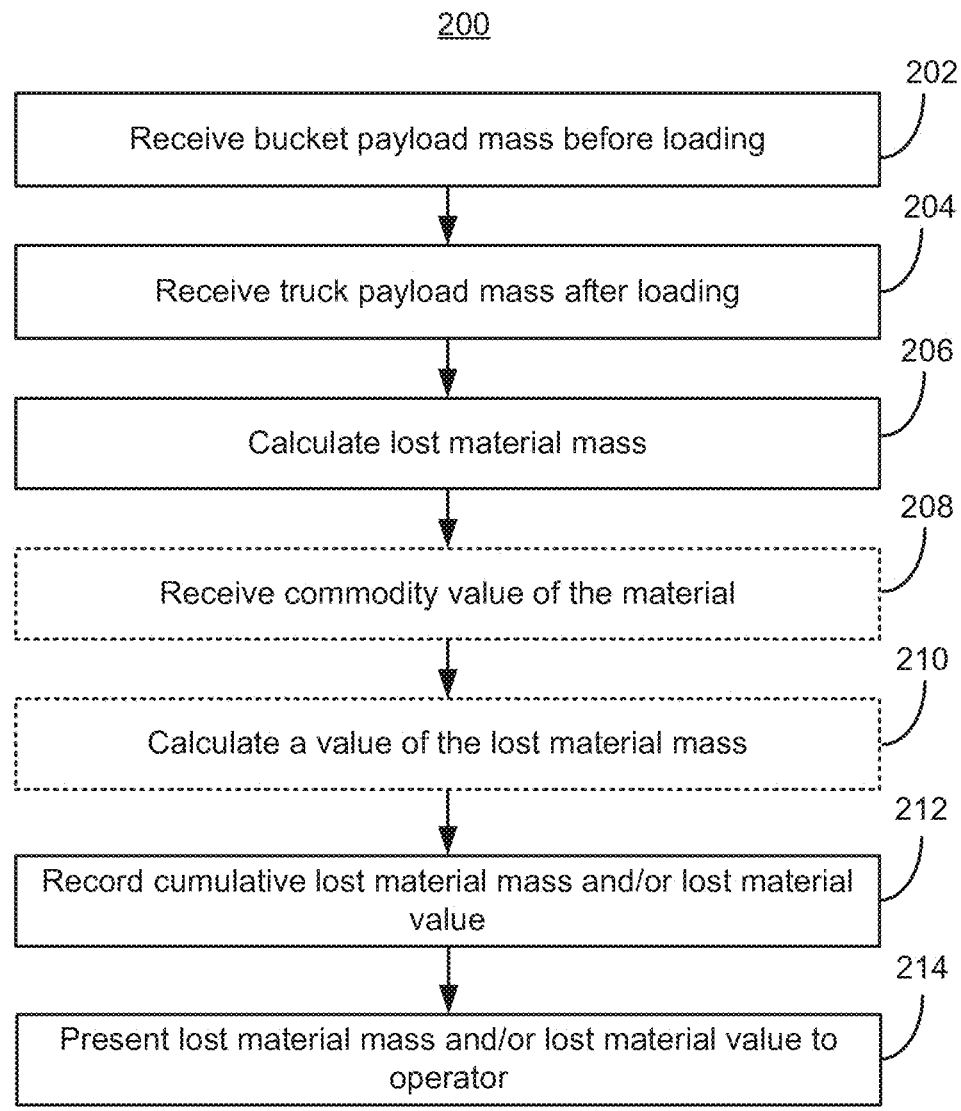
FIG. 5 is a flowchart of a method of performing payload monitoring comparisons.

FIG. 5 is a flow chart of a method 200 of payload monitoring comparison. At block 202, a bucket payload mass may be received at a controller 170. The bucket payload mass may be calculated in one of several known manners, such as the use of hydraulic pressure sensors and bucket position sensors. The controller 170 may be part of a loader 102 or located at a central station 132. The bucket payload is subsequently delivered to the truck 110. If an operator has designated this bucket payload as a calibration payload, an assumption is made that the operator will exert care to see that all the bucket payload material is delivered to the truck 110 so that an adjustment factor can be applied to account for any differences in the payload mass calculation systems of the loader 102 and the truck 110. In an embodiment, each truck 110 in use may have to have a calibration load to create a correction factor for each loader 102 in use.

At block 204, the truck payload mass is then received at the controller 170. The truck payload mass may be developed at the truck by any number of known mechanisms including strain gauges. Alternatively, the truck payload may be developed externally using a worksite scale and a standard "weight before loading" subtracted from "weight after loading."

At block 206, the truck payload mass may be subtracted from the bucket payload mass to calculate a lost material mass.

Optionally, at block 208, a commodity value of the material may be received at the controller 170. As discussed above, the commodity value may be stored in the controller 170 at the beginning of a shift or for highly volatile commodities, may be received on a regular basis via a network or broadcast feed.

In conjunction with block 208, optional block 210 may provide for calculation of a monetary value of the lost material mass by multiplying the lost material mass by the value of the material per unit.

At block 212, the cumulative lost material mass, lost material value, or both, may be recorded in a local memory, a remote memory, or via hardcopy. At block 214, the lost material mass, its value, or both may be presented in real time at an operator station in the loader 102 or at a dispatch or other console at the central station 132. As discussed above, the ability to present lost material information provides timely feedback for both loader operators and worksite managers to improve efficiency and lower costs.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A system for use in measuring material lost during vehicle loading at a worksite, the system comprising:
   a loader having a bucket;
   a bucket payload monitor that reports a first payload mass of the material delivered via the bucket of the loader;
   a truck configured to carry the material;
   a truck payload monitor that reports a second payload mass of the material loaded onto the truck via the bucket of the loader; and
   a controller configured to:
      subtract the second payload mass from the first payload mass to generate a lost payload mass,
      receive a commodity value of the material, and
      provide a business metric using the lost payload mass and the commodity value.

2. The system of claim 1, further comprising a reporting system that generates the business metric using the lost payload mass and provides the business metric to the controller.

3. The system of claim 1, wherein the business metric is a monetary value of the lost payload mass.

4. The system of claim 3, wherein the monetary value of the lost payload mass is calculated at the controller as a function of the commodity value of the material and the lost payload mass.

5. The system of claim 4, wherein the commodity value of the material is based on a real-time commodity price of the material.

6. The system of claim 1, wherein the business metric is a calculated number of extra trips, a time to clean up the lost payload mass at the worksite, or a cost of operating the loader during the calculated number of extra trips and cleanup time.

7. The system of claim 1, wherein the controller is part of a payload control system of the loader and the second payload mass is reported via a wireless network to the loader.

8. The system of claim 1, wherein the business metric is reported at an operator display of the loader.

9. The system of claim 1, wherein the controller is part of a central station and the first payload mass is reported via a wireless network from the loader to the central station and the second payload mass is reported via the wireless network from the truck to the central station.

10. The system of claim 1, wherein the controller is configured to calibrate a first test mass of the material delivered via the bucket and a second test mass of the material received at the truck under a no-lost payload mass loading condition.

* * * * *